May 15, 1962 P. SCHEUZGER 3,035,118

RECORDING DEVICE

Filed Oct. 15, 1959

INVENTOR.

PETER SCHEUZGER

BY Thomas E. Dorn

ATTY.

United States Patent Office 3,035,118
Patented May 15, 1962

3,035,118
RECORDING DEVICE

Peter Scheuzger, Evanston, Ill., assignor, by mesne assignments, to Victor Comptometer Corporation, Chicago, Ill., a corporation of Illinois Filed Oct. 15, 1959, Ser. No. 846,606
10 Claims. (Cl. 178—18)

This invention relates to a new and improved recording device and more particularly to a new and improved pen structure for the transmitter of a graphic communication system.

In a graphic communication system, data are manually transcribed on a recording surface at the transmitter by means of a pen or stylus which may be mechanically or electrically coupled to the transmitter apparatus. The transmitter apparatus generates signals representative of the movements of the stylus across the recording medium and transmits those signals to one or more receiving stations, where they are employed to control a recording stylus which reproduces the same data as is transcribed at the transmitter. Usually, three distinct kinds of information must be transmitted in a system of this type. Thus, the transverse movements of the transmitter pen or stylus may be electrically analyzed in terms of two different coordinate directions, so that two position signals are transmitted by the system. In addition, in order to complete the information necessary at the receiver, the transmitter generates a further signal indicative of movement of the stylus into and out of contact with the recording medium. The latter signal is frequently referred to, in the art, as a pen-lift signal.

To generate the requisite pen-lift signal, a switch may be incorporated in the transmitter stylus and may be actuated by engagement of the writing point of the stylus with the recording medium. Pen-switch structures of this kind have been utilized in the past with substantial success, but frequently present substantial and difficult problems with respect to reliability of operation. In the first place, the switch employed in the pen-lift circuit must be capable of actuation by relatively light pressures, since some operators employ a relatively light touch in using the transmitter, and may not exert more than a relatively light force upon the transmitter stylus in engaging it with the recording medium. On the other hand, other operators may bear down to a substantial extent on the transmitter stylus; consequently, it is necessary that the pen-lift switch in the pen be rugged and durable in construction. Furthermore, the pen-lift switch must be a rapid-operating device, since the transmitter stylus may be moved into and out of contact with the recording medium quite frequently during operation, particularly in the case of transmission of a written message. For the same reason, the transmitter pen-lift switch must be positive in action and must afford a good electrical contact, when closed, in order to make sure that a reliable pen-lift signal is transmitted. Previously known pen-lift switches for use in transmitter styli, although generally successful in operation, have not been effective to realize all of these requirements and have frequently presented difficulties with respect to reliability of operation and the necessity for maintenance.

In many graphic communication systems, two or more transmitters may be connected in the system for transmission of data to a plurality of receivers. It is not usually possible or practical to provide for simultaneous use of more than one transmitter in the system, and, of course, it is not normally possible to reproduce data from two transmitters, simultaneously, at a single receiver. Accordingly, in the past the transmitters in systems of this kind have been provided with suitable send-receive switching devices and the systems have usually been provided with interlocks which prevent connection of a transmitter to the system when another transmitter is already connected thereto for a sending operation. However, it sometimes happens that the operator at a given transmitter may forget to disconnect the transmitter from the system once he had completed a given sending operation. When this occurs, the system is tied up and it is usually necessary to call the operator and advise him to disconnect his transmitter in order that another transmitter may operate in the system. Needless to say, this materially reduces the efficiency of the system, particularly if it is relatively complex and includes a substantial number of transmitters and receivers.

It is a principal object of the invention, therefore, to provide a new and improved switching apparatus for use in the transmitter stylus of a graphic communication system which is effective to overcome the above noted disadvantages and difficulties of previously known devices.

A specific object of the invention is to provide a new and improved pen-lift switch, for a transmitter stylus, which is rugged in construction and reliable in operation, yet which can be actuated by relatively light engagement pressure between the transmitter stylus and a recording medium.

A further specific object of the invention is to provide a new and improved pen lift switch for the transmitter stylus of a graphic communication system which is capable of substantially maintenance-free operation in environments in which large quantities of dust and dirt are present and in which the stylus may be subject to rough handling or other adverse conditions.

A major object of the invention is to provide a new and improved shut-off system for a graphic communication system transmitter, which is effective to disconnect the transmitter electrically from the system, insofar as transmission is concerned, whenever the transmitter stylus is put down by the operator.

A further object of the invention is to incorporate a new and improved automatic shut-off switch in the transmitter stylus of a graphic communication system, which switch is automatically actuated from a first operating condition to a second operating condition whenever the stylus is inclined at less than a predetermined angle with respect to the horizontal, regardless of the rotational position of the stylus with respect to its own axis.

A specific object of the invention is to provide a new and improved contact construction for a switching device which permits the switch to be operated by tilting of the switch with respect to a given axis and which is substantially independent of rotation of the switch about that axis.

Another object of the invention is to provide an automatic shut-off system for a graphic communication system transmitter which is substantially foolproof in operation, yet is relatively simple and inexpensive in construction and does not add materially to the cost of the transmitter.

Other and further objects of the present invention will be apparent from the following description and claims and are illustrated in the accompanying drawings which, by way of illustration, show a preferred embodiment of the present invention and the principles thereof and what is now considered to be the best mode contemplated for applying those principles. Other embodiments of the invention embodying the same or equivalent principles may be used and structural changes may be made as desired by those skilled in the art without departing from the present invention.

Figures 1, 2, 3:
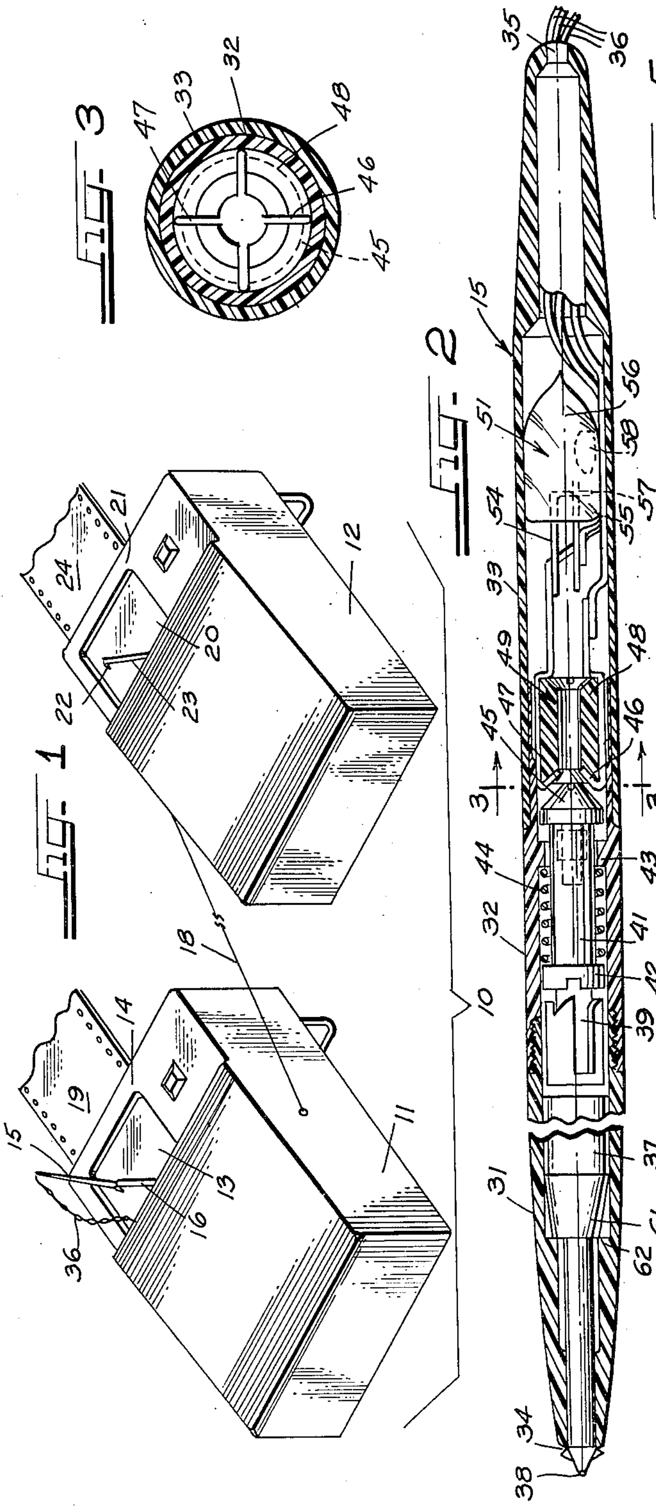
FIG. 1 is a perspective view of a graphic communication system in which the transmitter stylus of the present invention may be employed.
FIG. 2 is a detail sectional view, drawn to an enlarged scale, of a transmitter stylus constructed in accordance with a preferred embodiment of the invention.
FIG. 3 is a sectional view of a transmitter stylus taken approximately along line 3—3 in FIG. 2.

The communication system 10 illustrated in FIG. 1 comprises a transmitting station 11 and a receiving station 12. In a typical system, the stations 11 and 12 may each comprise a transceiver unit capable of operation as either a receiver or a transmitter; for the purpose of illustrating the present invention, however, station 11 is assumed to be a transmitter and station 12 to be a receiver.

The transmitter 11 includes a writing surface 13 which is encompassed by a frame 14; a writing pen or stylus 15 is mounted upon a support arm or link 16 for movement into and out of engagement with the writing surface 13. Stylus 15 is also movable transversely of the writing surface. For example, the stylus 15 may be mounted upon the arm 16 by means of a flexible plastic support member as described in detail in the co-pending application of Peter G. S. Mero, Serial No. 797,982, filed March 9, 1959. Thus, manual control of the stylus 15 permits the transcription of a message upon a recording medium such as the paper web 19 supported upon the writing surface 13. The message may comprise words, sketches, or any other data capable of reproduction by the stylus 15. The support arm 16 constitutes a part of a linkage system which controls the operation of electrical transmitter circuits within the transmitter unit 11; these transmitter circuits are utilized to develop suitable stylus-control signals which are transmitted to the receiver 12 as by a conductive line 18 interconnecting the two stations of the system.

The receiver unit 12 includes a writing surface 20 which is essentially similar in configuration to the transmitter writing surface 13 and which is bounded by a frame 21. A receiver stylus 22 is mounted upon a support arm or link 23 for movement into and out of contact with a paper web or other recording medium 24 supported on the writing surface 20 to inscribe a message or other data upon the paper. In general, the structural details and transmission system utilized in the communication apparatus of FIG. 1 are not critical with respect to the present invention. Preferably, the communication apparatus is similar to that described and claimed in United States Patent No. 2,583,535 to Robert Adler, issued January 29, 1952, and in United States Patent No. 2,649,503 to Robert Adler, issued August 18, 1953. Accordingly, reference may be had to these patents and to other previously known graphic recording systems to determine the general construction and operation of the system of FIG. 1.

As noted hereinabove the writing surface 13 of the transmitter 11 is covered with a suitable recording medium 19 which preferably comprises ordinary paper, and the writing surface 20 of the receiver 12 is covered with the paper web 24. The data to be transmitted is written, drawn, or otherwise inscribed on the recording medium at the transmitter writing surface 13. The movements of the stylus or pen 15 in transcribing this data are translated into electrical control signals which are transmitted to the receiver 12. In the receiver 12, these control signals are utilized to control suitable apparatus which moves the receiver recording stylus 22 across the writing surface 20 and into and out of contact therewith in synchronism with movements of the transmitter stylus. Thus, the message transcribed at the transmitter 11 is reproduced in essentially its original form at the receiver 12.

FIG. 2 is a detail sectional view of the transmitting stylus or pen 15 of the transmitter 11. As shown therein, the transmitter stylus 15 comprises a three-piece housing including a tip end housing section 31, a central housing section 32, and an upper housing section 33. The forward or tip end of the housing section 31 may be provided with a suitable recess 34 for mounting the pen 15 on a resilient support member as described in detail in the aforementioned co-pending application of Peter G. S. Mero. The back end of the housing, section 33, is provided with a suitable opening 35 to permit introduction of electrical leads, such as the insulated conductors 36, into the interior of the pen housing. The front end of the housing section 31 is removably mounted on the central section 32 and may, for example, be threaded into the central housing section. Within the housing section 31 there is mounted a conventional cartridge type ballpoint pen unit 37, the pen unit 37 being axially movable within the housing section 31. The writing tip of the cartridge pen unit 37 is indicated by the reference numeral 38.

At the end 39 of the cartridge pen unit 37 opposite the writing tip 38 the cartridge is engaged by a plunger 41 and specifically by a collar 42 on the plunger. The central portion 32 of the pen housing is provided with an internal shoulder 43 and a spring 44 is mounted within the housing section 32 in encompassing relation to the plunger 41 and in engagement with the plunger collar 42 and the housing shoulder 43. The spring 44 is effective to bias the plunger 41 and the cartridge pen unit 37 outwardly of the pen housing (to the left as seen in FIG. 2), but permits movement of the cartridge and the plunger inwardly of the housing during operation of the pen, as described hereinafter.

At the end of the plunger 41 opposite the collar 42 there is mounted a substantially cone-shaped contact member 45. The contact member 45 is aligned with a pair of contact elements 46 and 47 which are mounted upon an insulating support member 48. The contact assembly or switch 49 comprising the contact members 45 and 46 and the support member 48 is mounted in the end housing section 33 but projects inwardly of the central housing section 32 to a position relatively close to the contact member 45. The two housing sections 32 and 33 are releasably joined to each other, as by threads or other suitable means, to permit separation of the two housing sections and service of the switch assembly 49 if necessary. The cross-sectional view of FIG. 3 illustrates the alignment of the contact member 45 with the contact elements 46 and 47, the member 45 being shown in dash outline in this view.

The stylus 15 also includes a second switch 51 which constitutes an automatic shut-off device for the transmitter in which the stylus is employed. The construction of the switch 51 is shown in detail in the sectional perspective view of FIG. 4. As illustrated therein, the switch 51 includes a glass or other suitable insulator envelope 52 having a base 53 through which a pair of contact members 54 and 55 project into the interior of the envelope. The contact member 55 is of rod-like configuration and should be located approximately in coincidence with the longitudinal axis 56 of the envelope 52. The contact member 54, on the other hand, enters the envelope 52 adjacent one side thereof and is provided with a substantially circular contact portion 57 which is approximately centered with respect to the axis 56 of the switch and which is disposed in encompassing relation to the rod contact 55. The switch 51 is a mercury switch and includes, within the envelope 52, a suitable quantity of metallic mercury 58.

In mounting the switch 51 within the stylus 15, and particularly in the housing portion 33 thereof, the axis 56 of the switch should be made approximately coincident with or at least substantially parallel to the longitudinal axis of the stylus. Within the stylus 15, the contact members 54 and 55 are connected to two of the conductors 36 which extend into the stylus housing through the aperture 35. Moreover, in the illustrated arrangement two of the conductors 36 are connected to the contact elements 45 and 46 of the pen lift switch 49. If the two circuits in which the switches 49 and 51 are connected are completely independent of each other, it may be necessary to provide four individual conductive leads for the switches. Usually, however, one side of each of the two switches may be made common with the corresponding side of the other, and that has been done in the illustrated arrangement, in which the contact members 54 and 47 are connected to the same lead, which may be a ground connection.

In the use of the stylus 15, the first switch 49 is connected in a control circuit, in the transmitter 11, to control generation of a pen-lift signal indicative of engagement and disengagement of the stylus with the recording medium 19 on the recording surface 13 (see FIG. 1). The switch 51, on the other hand, is connected in a suitable circuit which is effective to connect and disconnect the operating circuits of the transmitter 11 and the transmission line 18. Inasmuch as the particular type of transmission control circuit employed is not critical with respect to the present invention, and since similar switching arrangements have been previously known in the art, the switch connections in the transmitter circuitry are not illustrated in the drawings, other than in the form of the conductors 36 (FIG. 2).

When the operator at the transmitter station 11 wishes to send a message to the receiver station 12 (FIG. 1), he first picks up the stylus 15. This action alone is effective to connect the transmitter 11 to the receiver station, as described more fully hereinafter in connection with the operation of the switch 51, provided no other transmitter station is presently operating on the line 18. To send a message to the receiver 12, the operator writes the message in conventional manner upon the paper 19 that is supported upon the writing surface 13. Each time the operator presses the writing tip 38 of the stylus 15 against the writing surface 13, the pen cartridge 37 is forced inwardly of the barrel or housing of the stylus 15. This inward movement of the pen cartridge forces the plunger 41 in the same direction and brings the contact member 45 into wiping engagement with both of the contact elements 46 and 47 of the switch assembly 49. Consequently, an electrical circuit is completed between two leads connected to the contact members 46 and 47, affording a means for controlling generation of a pen-lift signal representative of engagement of the stylus with the writing medium. Of course, the spring 44 opposes the movement of the cartridge 37 and the plunger 41. Consequently, the spring must be relatively weak, so that excessive pressure upon the pen is not required to generate the desired pen-lift signal. On the other hand, the spring 44 must be strong enough to move the plunger 41 and the cartridge 37 outwardly of the barrel (to the left as seen in FIG. 2) each time the operator lifts the pen 15 from contact with the recording medium, an action which may occur quite frequently in a written message. Consequently, the sliding parts 37 and 41 must be freely movable within the housing portions 31 and 32 of the stylus 15. The outward movement of the cartridge pen unit 37 and the plunger 41 is limited by engagement of a shoulder 61 on the cartridge unit with a corresponding shoulder 62 formed internally of the housing section 31.

The switch 49 affords several advantages, as compared with previously known pen-lift switches which have been used in graphic communication systems. In the first place, the configuration of the cone-shaped contact member 45 and individual contact elements 46 and 47 render the switch completely independent of angular orientation of the contacts with respect to each other. That is, the contact member 45 can be rotated to any desired extent, relative to the contact elements 46 and 47, from the positions shown in FIG. 2, without in any way affecting operation of the switch. The contacts are engaged by a wiping motion, which tends to keep them relatively clean and therefore permits use of the switch in environments where substantial amounts of dust or contaminating elements must be present. The switch construction is quite rugged and, depending upon the strength of the housing 31—33, can withstand virtually any shock to which it may be subjected. Furthermore, and again because of the configuration of the contact elements, it is not necessary to maintain any precise critical spacing between the contact member 45 and the contact elements 46. There are no delicate parts which can be easily bent or damaged, the relatively small contact elements 46 and 47 being fully and completely supported upon the insulating base member 48. In a preferred construction, the base member 48 is formed from paper base phenolic resin material, whereas the contacts 46 and 47 are fabricated from 0.023 inch diameter beryllium copper wire, which may be rhodium coated. The same material is preferably utilized in the construction of the contact element 45 which is mounted upon the plunger 41.

Figures 4, 5:
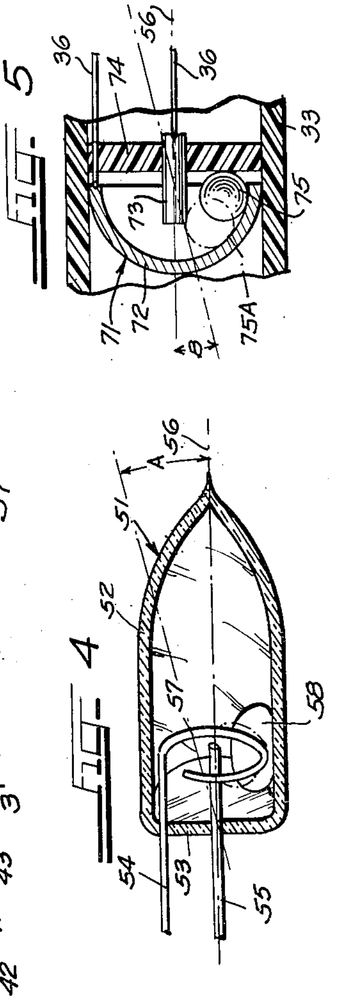
FIG. 4 is a detail sectional perspective view of an automatic shut-off switch included in the transmitter stylus of FIG. 2.
FIG. 5 is a detail sectional view of another automatic switch structure which may be employed in the stylus.

When the stylus 15 is disposed in a substantially horizontal position, as illustrated in FIGS. 2 and 4, the switch 51 is open. That is, the mercury 58 is in contact with only one of the contact elements, in this instance the contact portion 57 of the member 54. Furthermore, the switch can be tilted through a small angle from the horizontal without closing. Thus, the switch 51 can be tilted through an angle A, which is preferably of the order of approximately 15°, before the mercury 58 establishes contact between the elements 55 and 57. As soon as the switch has been tilted beyond the threshold angle A, however, the switch closes and remains closed as long as the stylus 15 is tilted by at least this much from the horizontal. Stated differently, the mercury switch 51 is actuatable between an open condition and a closed condition in response to movement of the stylus 15 between a rest position and a writing position, the writing position including any position in which the stylus is inclined to the horizontal by at least as much as a predetermined threshold angle A which is preferably made of the order of 15°.

Of course, it would be possible to construct the stylus 15 and particularly the switch 51 so that the switch would close at any time whenever the stylus is tilted above the horizontal, that is whenever the end 33 of the stylus is located above the end 31. This arrangement is undesirable, however, because it is always possible for the operator to put down the stylus 15, when a transmission has been completed, in a position in which the stylus is not precisely horizontal or in which the end 33 is not located below the end 31. Thus, the stylus might be leaned against the rim 14 of the writing surface 13 (see FIG. 1) or might be placed in some other location or disposed against some external object such as a pad of paper in a manner such that the transmitter 11 would remain connected in transmitting condition. On the other hand, because many people hold a writing stylus or pen at a substantial angle of inclination to the vertical, during use, the threshold angle A should not be made too large. Thus, the particular angle selected is subject to some variation but it should ordinarily be less than 30°, to afford full freedom of use of the stylus 15, and more than 10° to permit at least some variation in the position in which the operator drops the pen. This is particularly true because the operator may be in a hurry and may not pay any particular attention to the position of the stylus when it is put down. 15° has been found to be a useful threshold angle and would satisfy most operating conditions, but this angle is subject to variation depending upon the construction and the environment at which it is employed.

The construction of the contact elements 55 and 57, best shown in FIG. 4, comprises one of the more advantageous features of the present invention. With this construction, operation of the switch 51 is rendered substantially independent of rotation of the switch with respect to the axis 56. This is particularly important because there is no assurance that the operator will be at all consistent in the position in which the pin 15 is put down. Thus, the pen may be laid down to the right or left, or to the front or rear, or the writing surface 13, and in each instance the effective angular position of the switch 51 with respect to its axis, insofar as which part of the switch is down, is substantially different from the other positions. With the configuration of the contacts shown in FIG. 4, however, the one contact completely encircling the other, inconsistent dropping of the pen by the operator has no substantial effect upon operation of the switch. Of course, it is necessary to determine the amount of mercury 58 to be used in the switch 51 in accordance with the operational requirements of the switch. That is, care must be taken to provide enough mercury to afford contact at the desired threshold angle A, and this quantity is determined by the size of the envelope 52 and by the size of the contact members, and particularly the contact portion 57 of the contact member 54.

FIG. 5 is a sectional view illustrating an alternate switch construction which may be employed instead of the switch 51 of FIGS. 2 and 4. The switch structure 71 illustrated in FIG. 5 comprises a cup-shaped contact member 72 which is preferably substantially hemispherical in configuration and which is mounted within one of the stylus housing sections, such as the section 33, with the open end of the contact member facing away from the writing point of the pen. A second contact member 73 is included in the switch 71 and preferably comprises a rod-like member which is substantially co-axial with the contact member 72 and which extends partially into the cup-shaped contact element 72. The contact member 73 may, for example, be mounted upon a support member 74 formed from insulating material and extending across the interior of the housing section 33. Preferably, the rod contact element 73 is centered upon the axis 56 of the stylus, but this is not essential and the contact may be displaced somewhat from the axis of the pen, although it should be approximately parallel thereto. Each of the contact members 72 and 73 is connected to one of the conductors 36 which extend outwardly of the stylus to afford a means for connecting the stylus electrically to the operating circuits of the transmitter (see FIGS. 1 and 2). In addition, the switch 71 includes a movable contact element 75 which is not connected to any of the electrical conductors 36, but serves as a bridging element to establish contact between the contact members 72 and 73 as described hereinafter.

Like the previously described switch 51, the switch 71 constitutes an automatic transmission control switch which is actuatable between an open condition and a closed condition in response to movement of the transmitter stylus between a rest position and a writing position. Furthermore, and also like the switch 51, the rest position for the switch 71 includes any position in which the stylus is inclined to the horizontal by less than a preselected threshold angle and the writing position includes any location in which the stylus is inclined to the horizontal by more than that threshold angle. As before, the threshold angle may be of the order of 15° but may be made somewhat smaller or larger.

In FIG. 5, the switch is shown in a rest position, the axis 56 of the stylus extending approximately horizontally. In this position, the movable contact element 75 is disposed near the outer rim of the cup-shaped contact member 72, being prevented from falling out of the cup-shaped contact by the insulator member 74. In this position, the ball-like contact element 75 cannot bridge the space between the contacts 72 and 73, so that the switch is open. Furthermore, the sylus may be tilted through at least a small angle without causing the ball member 75 to bridge the gap between the contacts 72 and 73.

If the stylus containing the switch 71 is tilted, however, the ball member 75 is actuated by gravity and rolls toward the base of the cup-shaped member 72. At a given threshold angle B, the ball member comes into contact with the center contact member 73, as shown by the dash outline 75A. Since it is also in contact with the cup-shaped contact member 72, an electrical circuit is established between the two leads 36 connected to the contacts 72 and 73, effectively closing the switch 71. Thus, it is seen that the switch 71 operates in essentially the same manner as the above-described mercury switch 51.

The operation of ecah of the two switches 51 and 71 is completely independent of angular rotation of the stylus about its own axis 56. In both switches, the effective threshold angle, angle A for switch 51 and angle B for switch 71, can be changed by modifying the dimensions of the fixed contacts of the switch or by changing the size of the movable contact. That is, the quantity of mercury in the switch 51 may be varied to change the threshold angle A, and the size of the ball element 75 in the switch 71 may be modified slightly to change the angle B. Thus, both switches may be made to automatically disconnect the transmitter from the transmission system whenever the transmitter sylus is put down by the operator, regardless of the orientation of the stylus relative to its own axis, and without reference to any external element or device.

Hence, while I have illustrated and described the preferred embodiments of my invention, it is to be understood that these are capable of variation and modification.

I claim:

1. A transmitter stylus for a graphic communication system comprising: a stylus housing; and switch means, mounted in said housing, actuatable between an open condition and a closed condition in response to movement of said stylus between a position in which its longitudinal axis is substantially horizontal and a writing position in which the longitudinal axis of said stylus is inclined to the horizontal by a preselected threshold angle independently of angular orientation of the stylus about its longitudinal axis.

2. A transmitter stylus for a graphic communication system including a signal-transmission circuit, comprising: a stylus housing; switch means, comprising a switch mounted in said housing, actuatable between an open condition and a closed condition in response to movement of said stylus between a rest position and a writing position, said rest position including any position in which the longitudinal axis of said stylus is inclined to the horizontal by less than a preselected threshold angle of at least approximately 15°; and means for coupling said switch means to said signal transmission circuit to disable said circuit except when said stylus is in said writing position.

3. A transmitter stylus for a graphic communication system comprising: a stylus housing; and switch means, mounted in said housing and comprising a first contact member disposed in predetermined angular orientation relative to the longitudinal axis of said stylus housing, a second contact member disposed in spaced encompassing relation to said first contact member, and means for automatically electrically interconnecting and disconnecting said first and second contact members, comprising a movable contact member, actuatable by gravity between an open condition engaging only one of said first and second contact members and a closed condition engaging both, in response to movement of said stylus between a position in which its longitudinal axis is substantially horizontal and a writing position in which the longitudinal axis of said stylus is inclined to the horizontal by a preselected threshold angle, independently of angular orientation of the stylus about its longitudinal axis.

4. A transmitter stylus for a graphic communication system comprising: a stylus housing; and switch means, mounted in said housing comprising a first rod-shaped contact member disposed in substantially parallel relation to the longitudinal axis of said stylus housing, a second contact member disposed in spaced partially encompassing relation to said first contact member, and means for automatically electrically interconnecting and disconnecting said first and second contact members, comprising a movable contact member, actuatable by gravity between an open condition in which said movable contact member engages only said second contact member and a closed condition in which said movable contact element engages both of said first and second contact members, in response to movement of said stylus between a position in which its longitudinal axis is substantially horizontal and a writing position in which the longitudinal axis of said stylus is inclined to the horizontal by a preselected threshold angle, independently of angular orientation of stylus about its longitudinal axis.

5. A transmitter stylus for a graphic communication system comprising: a stylus housing; and switch means, mounted in said housing, actuatable between an open condition and a closed condition in response to movement of said stylus between a rest position and a writing position, said writing position including any position in which the longitudinal axis of said stylus is inclined to the horizontal by at least approximately 15°, said switch means comprising an envelope which is substantially symmetrical with respect to an envelope axis parallel to the longitudinal axis of said stylus housing, a first contact member extending into said envelope in substantial coincidence with said envelope axis, a second contact member extending into said envelope at a point displaced from said envelope axis and terminating in a contact portion encompassing said first contact member in substantially uniform spaced relation thereto, and a quantity of mercury disposed within said envelope sufficient to engage only said second contact member when said stylus is in said raised position and to engage both of said contact members when said stylus is in said writing position.

6. A transmitter stylus for a graphic communication system, comprising: a stylus housing; and automatic transmission control switch means comprising a mercury switch mounted in said housing an actuatable between an open condition and a closed condition in response to movement of said stylus between a rest position and a writing position, said rest position including any position in which the longitudinal axis of said stylus is inclined to the horizontal by less than a preselected threshold angle of at least approximately 15°.

7. A transmitter stylus for a graphic communication system including a signal-transmission circuit, comprising: a stylus housing; a writing element mounted in said housing and projecting outwardly thereof; a pen-lift control switch, mounted within said housing and actuatable between a closed and an open condition in response to movement of said writing element into and out of engagement with a recording medium; and a line-connection switch, mounted in said housing, actuatable between an open condition and a closed condition in response to movement of said stylus between a rest position and a writing position, said writing position being any position in which the longitudinal axis of said stylus is inclined to the horizontal by a preselected threshold angle of at least approximately 15°.

8. A transmitter stylus for a graphic communication system comprising: a stylus housing; a writing element slidably mounted in said housing; spring means urging said writing element outwardly of said housing; a substantially cone-shaped contact member effectively connected to said writing element for movement therewith; an insulating support member, mounted within said stylus housing and having a substantially conical recess facing said contact member; and a pair of contact elements mounted on said support member and projecting into said recess, in spaced relation to each other, in position to be engaged and electrically connected by wiping contact with said contact member, upon movement of said writing element inwardly of said housing and to limit such inward movement of said writing element.

9. A transmitter stylus for a graphic communication system comprising: a stylus housing; a writing element comprising a cartridge-type pen unit slidably mounted in said housing; a plunger slidingly mounted in said housing and having one end engaging said writing element; a spring, disposed in encompassing relation to said plunger, for urging said plunger and said writing element outwardly of said housing; a substantially cone-shaped contact member mounted on said plunger at the end thereof opposite said writing element; an insulating support member, mounted within said stylus housing and having a substantially conical recess facing said contact member; and a pair of contact elements comprising individual wires mounted on said support member and projecting into said recess, in spaced relation to each other, in position to be engaged and electrically connected by wiping contact with said contact member, upon movement of said writing element and said plunger inwardly of said housing and to limit such inward movement of said writing element.

10. A transmitter stylus for a graphic communication system comprising: a stylus housing; a writing element slidably mounted in said housing; spring means urging said writing element outwardly of said housing; a substantially cone-shaped contact member effectively connected to said writing element for movement therewith; an insulating support member, mounted within said stylus housing and having a substantially conical recess facing said contact member; a pair of contact elements mounted on said support member and projecting into said recess, in spaced relation to each other, in position to be engaged and electrically connected by wiping contact with said contact member upon movement of said writing element inwardly of said housing; and a shut-off switch mounted in said housing, actuatable between an open condition and a closed condition in response to movement of said stylus between a rest position and a writing position including any position in which the longitudinal axis of said stylus is inclined to the horizontal by at least approximately 15°.

References Cited in the file of this patent

UNITED STATES PATENTS

| | | |
|---|---|---|
| 407,581 | Dewey | July 23, 1889 |
| 1,658,620 | Walker | Feb. 7, 1928 |
| 1,875,048 | Levene | Aug. 30, 1932 |
| 2,107,570 | Hobbs | Feb. 8, 1938 |
| 2,334,271 | Malm | Nov. 16, 1943 |
| 2,512,089 | Cervin | June 20, 1950 |
| 2,548,478 | Kavanaugh | Apr. 10, 1951 |
| 2,601,142 | Hobbard | June 17, 1952 |

FOREIGN PATENTS

| | | |
|---|---|---|
| 885,013 | Germany | July 30, 1953 |